United States Patent
Majdabadi et al.

(10) Patent No.: US 12,455,892 B2
(45) Date of Patent: Oct. 28, 2025

(54) ARTIFICIAL INTELLIGENCE BASED BOT-ENHANCED RETRIEVAL OF DRILL THROUGH DATA

(71) Applicant: International Business Machines Corporation, Armonk, NY (US)

(72) Inventors: Hamid Majdabadi, Ottawa (CA); Su Liu, Austin, TX (US); Jeremy R. Fox, Georgetown, TX (US); Zachary A. Silverstein, Georgetown, TX (US)

(73) Assignee: International Business Machines Corporation

(*) Notice: Subject to any disclaimer, the term of this patent is extended or adjusted under 35 U.S.C. 154(b) by 83 days.

(21) Appl. No.: 18/345,274

(22) Filed: Jun. 30, 2023

(65) Prior Publication Data
US 2025/0005030 A1    Jan. 2, 2025

(51) Int. Cl.
*G06F 16/00* (2019.01)
*G06F 16/248* (2019.01)
*G06F 16/25* (2019.01)

(52) U.S. Cl.
CPC .......... *G06F 16/248* (2019.01); *G06F 16/258* (2019.01)

(58) Field of Classification Search
CPC ............................ G06F 16/248; G06F 16/258
See application file for complete search history.

(56) References Cited

U.S. PATENT DOCUMENTS

| | | | |
|---|---|---|---|
| 7,139,766 B2 | 11/2006 | Thomson et al. | |
| 8,301,665 B2 | 10/2012 | Sieb | |
| 9,047,338 B2 | 6/2015 | Rasmussen et al. | |
| 9,390,148 B2 | 7/2016 | Hammoud | |
| 2002/0198899 A1* | 12/2002 | Yamaguchi | G06F 16/27 |
| 2004/0034615 A1* | 2/2004 | Thomson | G06F 16/2465 |
| 2004/0139102 A1 | 7/2004 | Vierich et al. | |
| 2005/0120021 A1 | 6/2005 | Tang et al. | |
| 2008/0295007 A1* | 11/2008 | Bernhardt | G06Q 10/10 715/764 |

(Continued)

FOREIGN PATENT DOCUMENTS

| | | |
|---|---|---|
| CN | 109918363 B | 1/2023 |
| WO | 2021238045 A1 | 12/2021 |
| WO | 2022060071 A1 | 3/2022 |

OTHER PUBLICATIONS

Mason Bradley, "The Best AI Online Meeting Feature You Aren't Using yet", Apr. 25, 2018, 9 pages.

*Primary Examiner* — Dinku W Gebresenbet
(74) *Attorney, Agent, or Firm* — Kelsey M. Skodje

(57) ABSTRACT

An approach for enhancing retrieval of drill through data is provided. A determination is made as to whether a source report generated from query results of a query by a user contains a data item that is associated with drill through data. In response to a positive determination, a data drill Meta-dataBot (DDMB) is initiated. In response to activation, the DDMB searches metadata associated with the query results to identify a set of DDMB parameters for the data item. These DDMB parameters can include the cell that contains the data item and a target report containing the drill through data for the cell. Based on this search, the DDMB generates an augmented report that contains a visual identifier for the drill through data-associated cell, allowing the user to retrieve the target report by interacting with the visual identifier.

20 Claims, 11 Drawing Sheets

(56) References Cited

U.S. PATENT DOCUMENTS

| | | | |
|---|---|---|---|
| 2010/0153333 A1* | 6/2010 | Rasmussen | G06F 16/907 |
| | | | 707/E17.014 |
| 2011/0295860 A1 | 12/2011 | Dewar et al. | |
| 2013/0117649 A1* | 5/2013 | Hammoud | G06F 16/2425 |
| | | | 715/212 |
| 2019/0370230 A1* | 12/2019 | Jacob | G06F 16/2365 |
| 2020/0342032 A1* | 10/2020 | Subramaniam | G06N 3/006 |
| 2021/0201404 A1* | 7/2021 | Schwartz | G06N 20/00 |

* cited by examiner

FIG. 4B

ARTIFICIAL INTELLIGENCE BASED BOT-ENHANCED RETRIEVAL OF DRILL THROUGH DATA

The present invention relates generally to data storage and retrieval. More specifically, aspects of the present invention provide solutions that utilize artificial intelligence to optimize retrieval of drill through data in a networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

The large scale of resources provided by the network computing environment allows large amounts of data from many different sources to be stored across a large number of physical locations. As the amount of data has continued to surge, it has become increasingly important to be able to identify useful data from among the "noise" and to be able to make sense of the identified data. Because of this, the value of intelligence, data mining/analytics and analytic integration and visualization has surged in importance in recent years in the business environment as well as others. This is highlighted by the massive data analytics in social media and ever-growing cloud-based storage, accessibility and analytic market.

One increasingly useful tool being used in the data analytics domain is data drilling. Data drilling is a technique in which a report that is currently the subject of use or search (the source report) is connected to one or more reports that contain related information (the target report). This connection can enable users to use a single source report, which may be an interactive report, as a starting point for exploring a network of linked reports. These data drilling connections can enable the ability of the user to drill down to a target report in lower hierarchical level from the source report, drill up to a target report in a higher hierarchical level from the source report, drill in to a target report that contains more detailed information about a piece of information contained in the source report, and/or drill through to a target report that contains additional relevant information that provides context for the information in the source report.

In any case, the use of data drilling can enable a user to obtain more relevant information and answers to questions from a single linked report. This can allow the user to discover trends and patterns as well as causality details for a particular event. Moreover, the ability to examine and understand information while maintaining the context of the data can allow the user to switch between reports within an information gathering session while maintaining a focus on the same piece of data. These benefits can allow the user to extract deeper insights into the data while also making the reporting process more intuitive and efficient.

SUMMARY

Embodiments of the present invention provide an approach for enhancing retrieval of drill through data. A determination is made as to whether a source report generated from query results of a query by a user contains a data item that is associated with drill through data. In response to a positive determination, a data drill MetadataBot (DDMB) is initiated. In response to activation, the DDMB searches metadata associated with the query results to identify a set of DDMB parameters for the data item. These DDMB parameters can include the cell that contains the data item and a target report containing the drill through data for the cell. Based on this search, the DDMB generates an augmented report that contains a visual identifier for the drill through data-associated cell, allowing the user to retrieve the target report by interacting with the visual identifier.

One aspect of the present invention includes a computer-implemented method for enhancing retrieval of drill through data, comprising the computer-implemented steps of: determining whether a source report generated from query results of a query by a user contains a data item that is associated with drill through data; initiating, in response to a determination that the source report contains the data item that is associated with the drill through data, a data drill MetadataBot (DDMB); searching, in response to the initiating of the DDMB, metadata associated with the query results to identify a set of DDMB parameters for the data item associated with the drill through data, the DDMB parameters including a cell containing the data item that is associated with the drill through data and a target report containing the drill through data; generating, by the DDMB, an augmented report that contains a visual identifier for the cell associated with the drill through data; and retrieving the target report in response to the user interacting with the visual identifier.

A second aspect of the present invention provides a system for enhancing retrieval of drill through data, comprising: a memory medium comprising program instructions; a bus coupled to the memory medium; and a processor, for executing the program instructions, coupled to the memory medium that when executing the program instructions causes the system to: determine whether a source report generated from query results of a query by a user contains a data item that is associated with drill through data; initiate, in response to a determination that the source report contains the data item that is associated with the drill through data, a data drill MetadataBot (DDMB); search, in response to the initiating of the DDMB, metadata associated with the query results to identify a set of DDMB parameters for the data item associated with the drill through data, the DDMB parameters including a cell containing the data item that is associated with the drill through data and a target report containing the drill through data; generate, by the DDMB, an augmented report that contains a visual identifier for the cell associated with the drill through data; and retrieve the target report in response to the user interacting with the visual identifier.

A third aspect of the present invention provides a computer program product for enhancing retrieval of drill through data, the computer program product comprising a computer readable storage device, and program instructions stored on the computer readable storage device, to: determine whether a source report generated from query results of a query by a user contains a data item that is associated with drill through data; initiate, in response to a determination that the source report contains the data item that is associated with the drill through data, a data drill MetadataBot (DDMB); search, in response to the initiating of the DDMB, metadata associated with the query results to identify a set of DDMB parameters for the data item associated with the drill through data, the DDMB parameters including a cell containing the data item that is associated with the drill through data and a target report containing the drill through data; generate, by the DDMB, an augmented report that contains a visual identifier for the cell associated with the drill through data; and retrieve the target report in response to the user interacting with the visual identifier.

BRIEF DESCRIPTION OF THE DRAWINGS

These and other features of this invention will be more readily understood from the following detailed description of the various aspects of the invention taken in conjunction with the accompanying drawings in which:

FIGS. 4A-B show aspects of a report according to illustrative embodiments;

Figure 1:
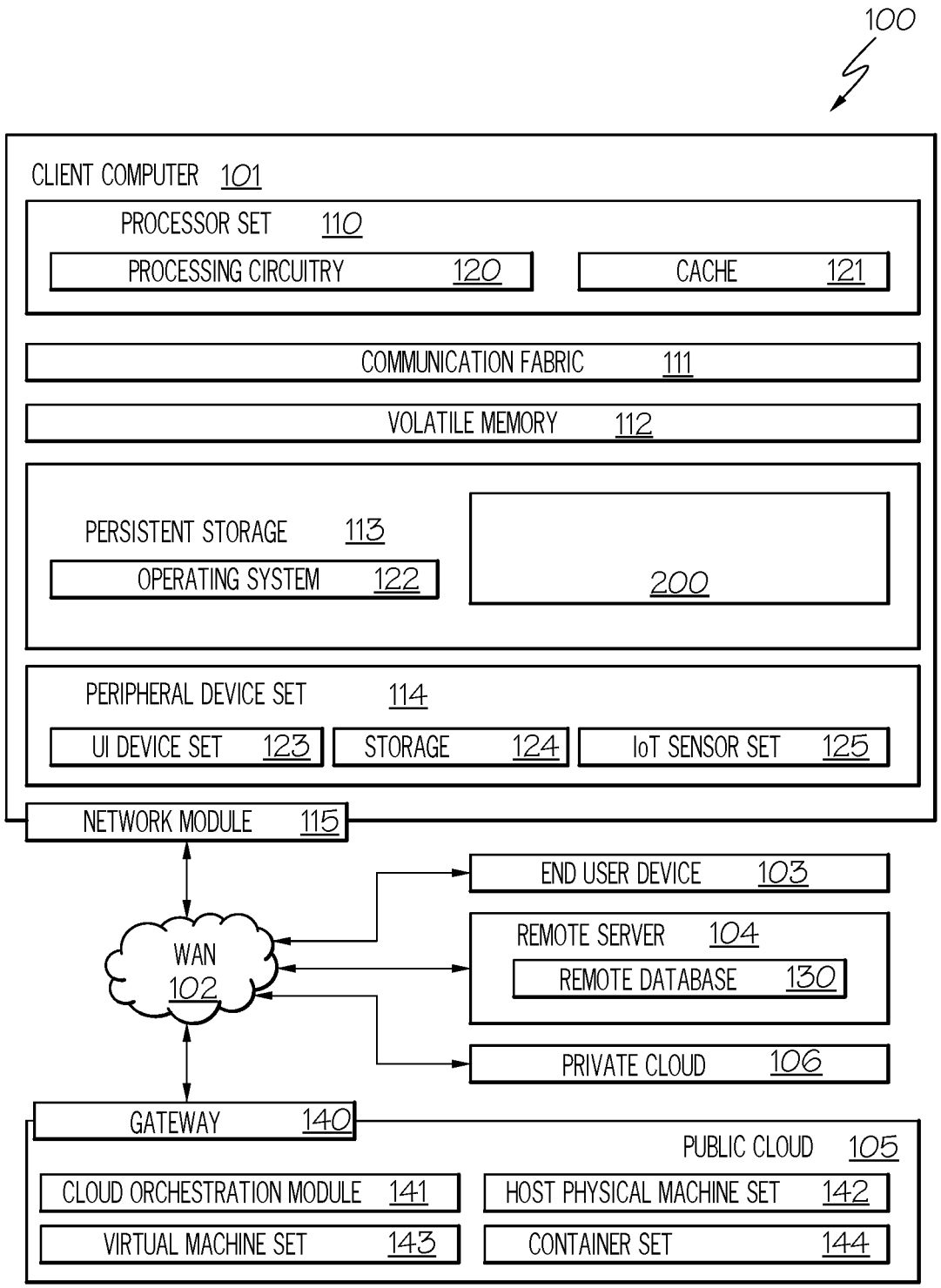
FIG. 1 shows a computing environment in which the invention may be implemented according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the embodiments set forth herein. Rather, these illustrative embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Furthermore, the term "developer" refers to any person who writes computer software. The term can refer to a specialist in one area of computer programming or to a generalist who writes code for many kinds of software.

As indicated above, embodiments of the present invention provide an approach for enhancing retrieval of drill through data. A determination is made as to whether a source report generated from query results of a query by a user contains a data item that is associated with drill through data. In response to a positive determination, a data drill MetadataBot (DDMB) is initiated. In response to activation, the DDMB searches metadata associated with the query results to identify a set of DDMB parameters for the data item. These DDMB parameters can include the cell that contains the data item and a target report containing the drill through data for the cell. Based on this search, the DDMB generates an augmented report that contains a visual identifier for the drill through data-associated cell, allowing the user to retrieve the target report by interacting with the visual identifier.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as enhanced drill through retrieval engine 200 (hereinafter "system 200"). In addition to system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
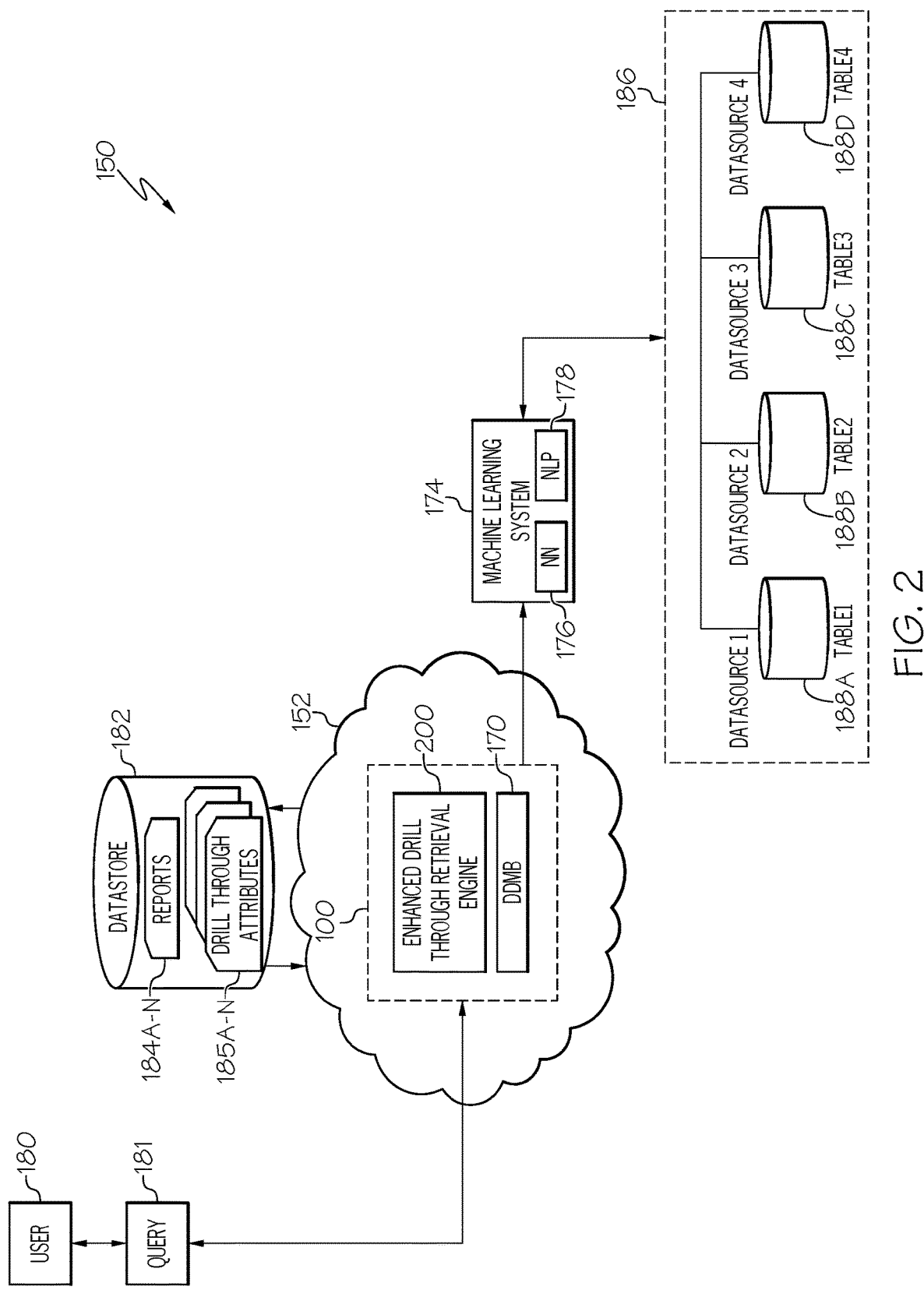
FIG. 2 shows a system diagram describing the functionality discussed herein according to an embodiment of the present invention.

Referring now to FIG. 2, a system diagram describing the functionality discussed herein according to an embodiment of the present invention is shown. It is understood that the teachings recited herein may be practiced within any type of networked computing environment 150 (e.g., a cloud computing environment 152). A stand-alone computing environment is shown in FIG. 2 for illustrative purposes only. In the event the teachings recited herein are practiced in a networked computing environment, each client need not have an enhanced drill through retrieval engine (hereinafter "system 200"). Rather, all or part of system 200 could be loaded on a server or server-capable device that communicates (e.g., wirelessly) with the clients to provide for enhancing retrieval of drill through data.

Environment 150 may include machine learning system 174. Machine learning system 174 can include a neural network (NN) 176, and/or a natural language processing (NLP) module 178. In some embodiments, the machine learning system 174 may include a Support Vector Machine (SVM), Decision Tree, Recurrent Neural Network (RNN), Long Short Term Memory Network (LSTM), Radial Basis Function Network (RBFN), Multilayer Perceptron (MLP), and/or other suitable neural network type. In embodiments, the machine learning system 174 is trained using supervised learning techniques.

NLP module 178 may include software and/or hardware for performing Natural Language Processing (NLP). NLP is a subfield of artificial intelligence that involves teaching computers to understand, interpret, and/or generate human language. NLP works by breaking down human language into its constituent parts and analyzing them using various algorithms and techniques. In one or more embodiments, the NLP process includes tokenization, which can include breaking down a piece of text into individual words or phrases. The NLP process can further include Part-of-speech (POS) tagging. POS tagging can include analyzing each token and assigning it a part of speech, such as noun, verb, adjective, or adverb. The NLP process can further include parsing, which involves analyzing the syntactic structure of a sentence to identify the relationships between the words and phrases. The process can include entity detection, which involves identifying and categorizing named entities in a piece of text, such as people, places, organizations, and dates. In one or more embodiments, the NLP process may be used on log data to identify the parameters of a log line, such as numbers, portions of JSON objects, dates, and so on, which helps to identify the log record template corresponding to a given log line. In this way, keywords can be automatically extracted and used for scoring of log lines in one or more embodiments.

Environment 150 also may include storage system 186. Storage system 186 can include one or more datasources 188A-188D, which can be used to store report data. To this extent, one or more of datasources 188A-D can be dedicated to short-term storage, long-term storage, archival storage, and/or the like. To accomplish this, one or more of datasources 188A-D can include one or more magnetic storage devices such as hard disk drives (HDDs), one or more solid state drives (SSDs), one or more magnetic tape storage devices, one or more quantum storage devices, and/or one or more devices that store report data using any storage solutions now known or later developed. In any case, the report data stored in storage system can be used to generate one or more reports in response to a query 181 from a user 180.

Figure 3:
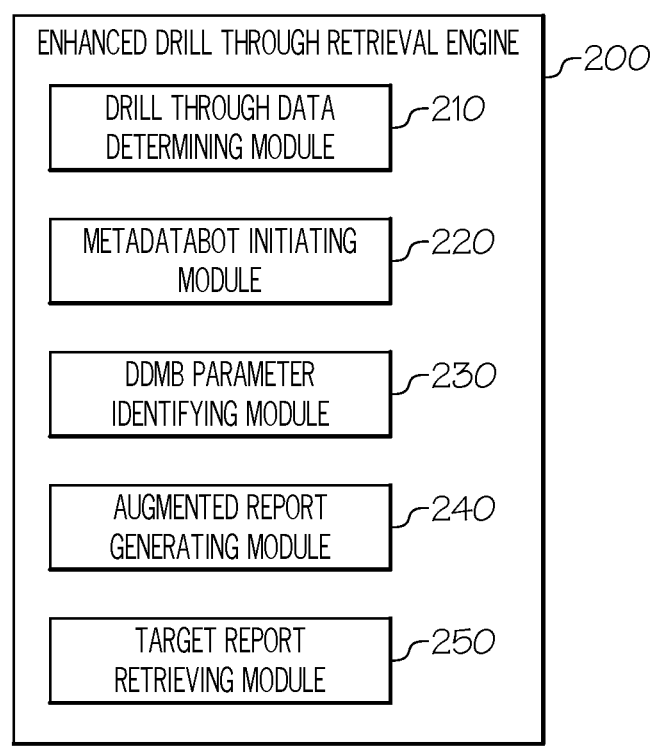
FIG. 3 shows a block diagram that illustrates a system according to illustrative embodiments.

Referring now to FIG. 3, a block diagram that illustrates system 200 is depicted according to illustrative embodiments. It should be understood that system 200 can be implemented as program/utility on computing environment 100 of FIG. 1 and can enable the functions recited herein. Along these lines, system 200 may perform multiple functions. Specifically, among other functions, system 200 can enhance retrieval of drill through data in a networked computing environment. To accomplish this, system 200 can include a set of components (e.g., program modules) for carrying out embodiments of the present invention. These components can include, but are not limited to, drill through data determining module 210, MetadataBot initiating module 220, DDMB parameter identifying module 230, augmented report generating module 240, and target report retrieving module 250.

Figure 4A:
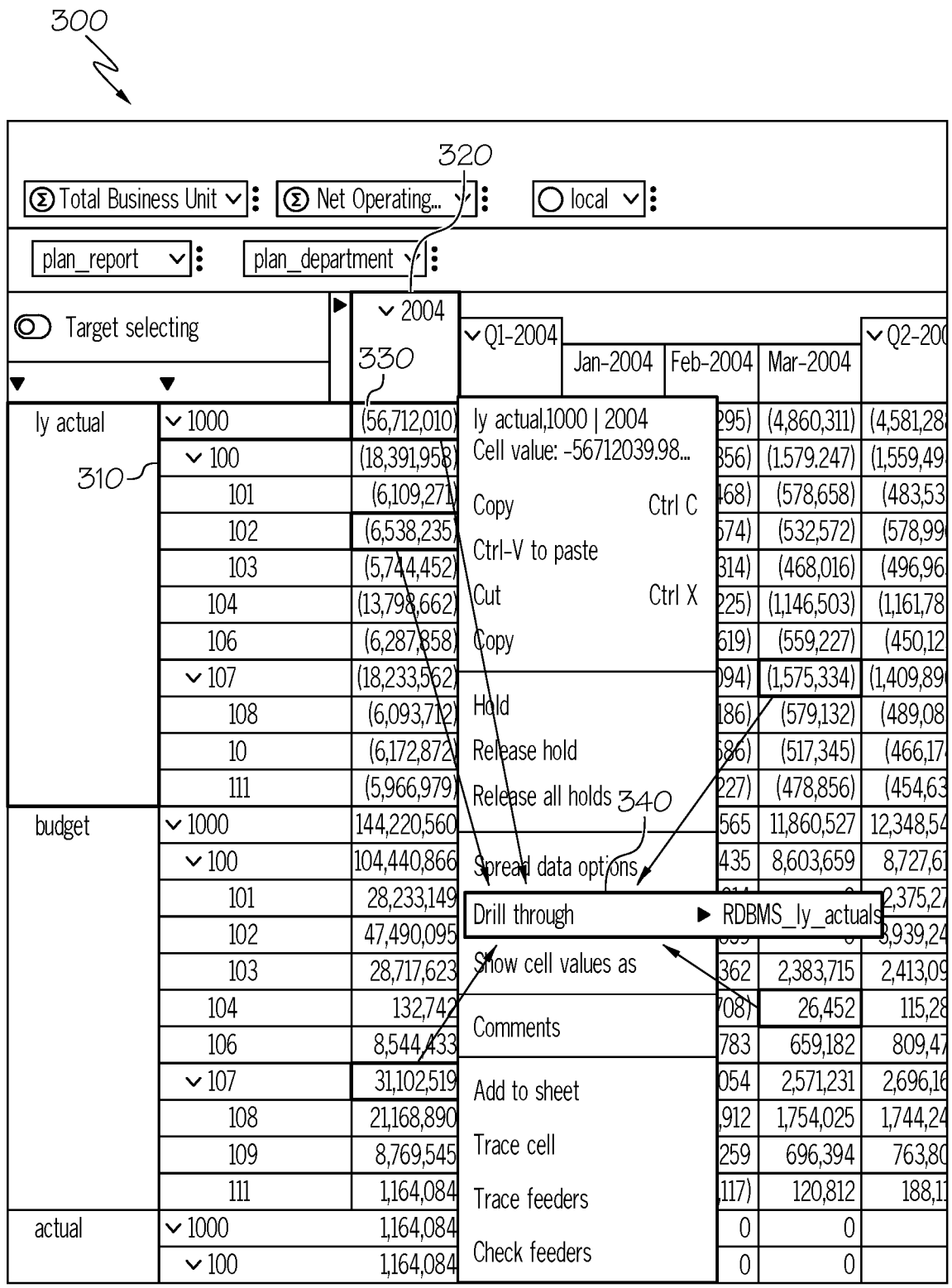
Figure 4B:
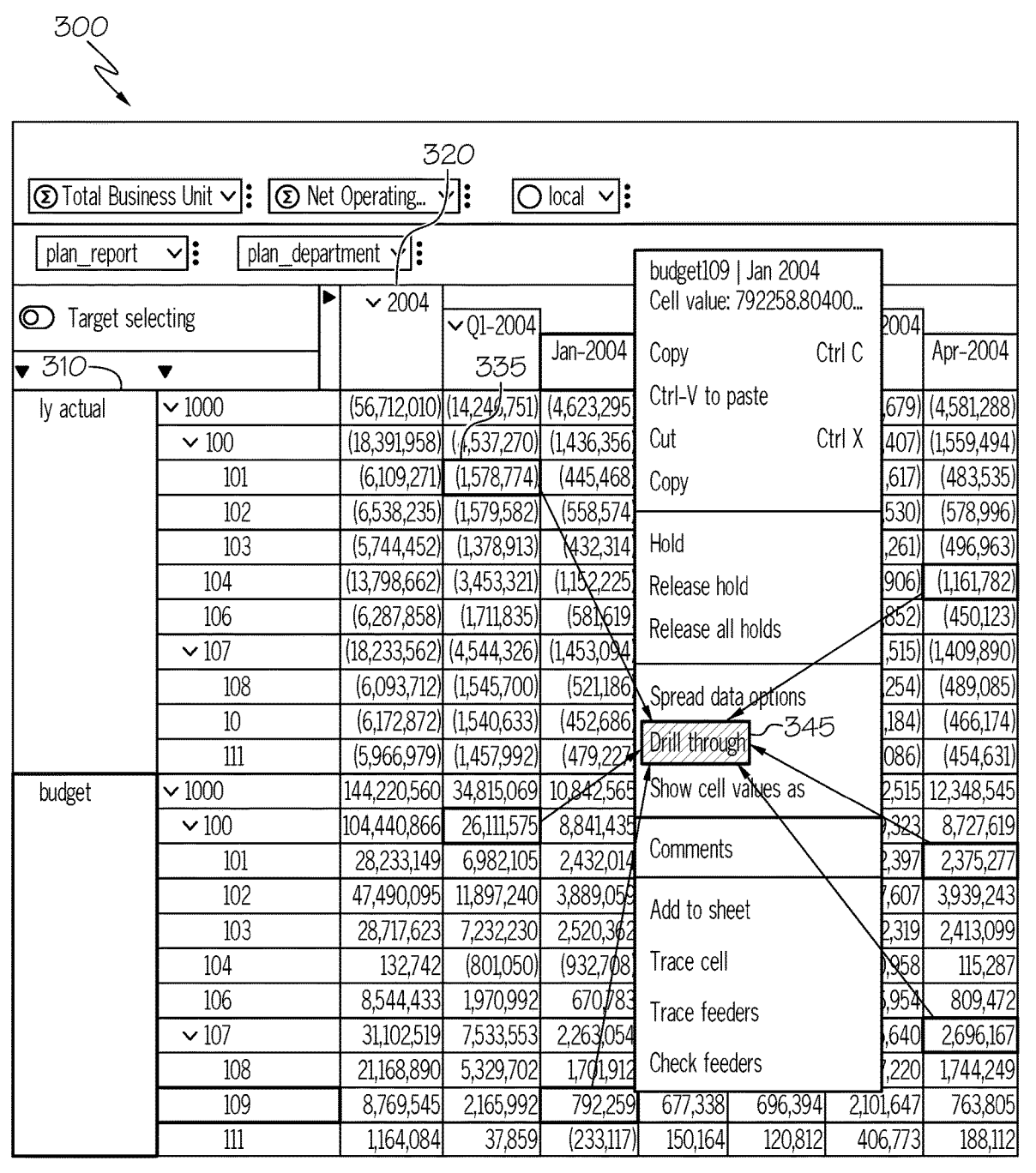

Referring now to FIGS. 4A-B, aspects of a report 300 are shown according to embodiments of the invention. As shown, report 300 has data that is arranged in a number of cells. These cells can be addressed by row 310 and column 320 such that each individual cell refers to a meaningful piece of data. In addition, to providing format for displaying data in a meaningful way, report 300 may also include additional functionality. For example, report 300 can include functionality that allows user 180 (FIG. 2) of report 300 to access other reports using data drilling. As shown, a number of cells in report 300, including cell 330, are linked 340 to additional reports that contain drill through data. However, not all of the cells in report 300 have this type of functionality. For example, a number of cells, including cell 335 are not linked 345 to additional reports that contain drill through data.

The inventors of the invention described herein have discovered a number of challenges in the way in which drill through contract reports 300 provide present drill down data for retrieval by user 180 (FIG. 2). Currently, when a report (target report) is identified that contains drill through data relating to a cell 330 in report 300 (source report), the target report is defined, and data values are sent from the source report 300 to filter the target report to narrow the data in the target report to that which relates to the cell 330 in the source report 300 so that any links can available to user 180 (FIG. 2) from the source report 300. However, currently, rules indicating drill through data that have been assigned to data cell intersections 330 within source report 300 are not visually identifiable within the data analytic portals and database view in the reporting dashboard in which the user 180 (FIG. 2) views the source report.

As such, identifying cells 330 that may have access to associated drill through data is currently an iterative task that is not complete unless each cell is clicked and checked for the presence of drill through data. However, it can be difficult to identify and detect embedded data-driven links for drill through insight exploration manually. For example, even in the relatively small visible portion of report 300 shown, in which 21 rows and seven columns can be seen, user 180 (FIG. 2) would have to manually right-click on 147 cells in order to check for associated drill through data. Further, it is not enough for user 180 (FIG. 2) to check every cell once and remember the locations of all cells that are associated with drill through data. Rules can change, adding links to new drill through target reports or removing links to drill through target reports that may no longer be deemed relevant. These target cell data updates can impact drill assignments to one or many cells in a single view. Thus, in order to maintain accurate information about the drill through data in report 300, user 180 (FIG. 2) would have to re-check all cells in report 300 manually every time user 180 (FIG. 2) accessed the source report.

Moreover, current solutions for dealing with drill through report data fail to take related target reports into consideration when the source report 300 is being migrated or backed up. This can result in widely disparate locations having to be accessed when a source report 300 that has related target reports needs to be retrieved, costing time and resources.

The invention described herein utilizes a machine learning system 174 to detect user interactions to drill down data by means of robotic process automation (RPA). The invention further performs task mining in an embedded Data Drill MetadataBot (DDMB) visualization tool. The discovered patterns are provided for accelerated data manipulation and visualization. The AI-driven RPA automates data and query link dependency monitoring, detection, verification and correlation. The results can be used to generate a real-time automated actionable insight against user generated custom data query. Further, contextual metadata can be defined or predefined, such as instructions on how to detect a customized data logic, when to invoke the logic, how to correlate the logic with an action, etc. For example, DDMB can identification drill through logic triggered by linked rule and metadata updates, detecting drill through rules and logic when migrating data, and/or Automate the scheduled backup of data and analytic content to always accompany related assets. The resulting process is less time consuming and less prone to human error and saves computer time and resources.

Referring now to FIG. 2 in conjunction with FIG. 3 and FIGS. 4A-B, drill through data determining module 210, as executed by computing environment 100, is configured to determine whether a source report 300 generated from query results of query 181 by user 180 contains a data item (e.g., in cell 330) that is associated with drill through data. In order to accomplish this, a framework can be created that includes a set of drill through attributes 185A-N pertaining to each of a number of reports 184A-N, and this information can be stored (e.g., a datastore 182).

Figure 5:
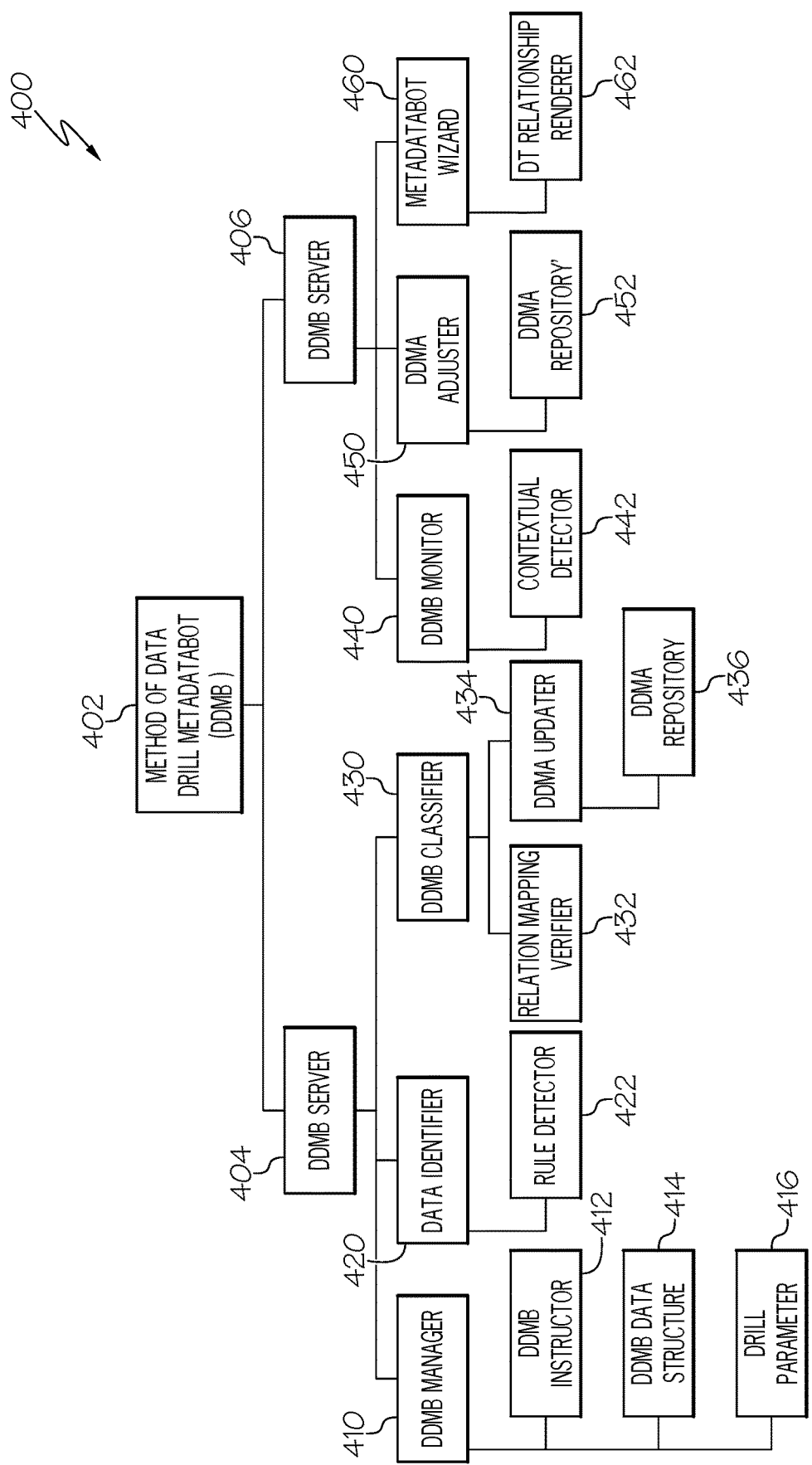
FIG. 5 shows a framework for supporting the functionality of the invention according to illustrative embodiments.

Referring now to FIG. 5, a framework 400 for supporting the functionality 402 of the invention is shown according to embodiments. Referring additionally to FIG. 2, as shown, framework 400 can include a DDMB server 404 that gathers and serves information that can be used by DDMB 170 (FIG. 2) and a DDMB client 406 that initiates DDMB 170 and uses DDMB to provide enhanced drill through to user 180. Once the DDMB server 404 has been established, a DDMB manager 408 can be created. DDMB manager 408 can be used to create and manage a DDMB data structure 414 that contains information necessary for tracking and saving updates to drill through attributes 185A-N. To this end, DDMB data structure 414 can include a number of data fields, including but not limited to, DataBaseID, CellID, TargetDrillID, SourceReportID, TargetReportID, SourceLocationID, and MappingID for each drill parameter 416. In addition, a set of dynamic action-based instructions that can be triggered by the addition of a new metadata property in DDMB data structure 414 can be defined in a DDMB instructor 412.

Figure 6:
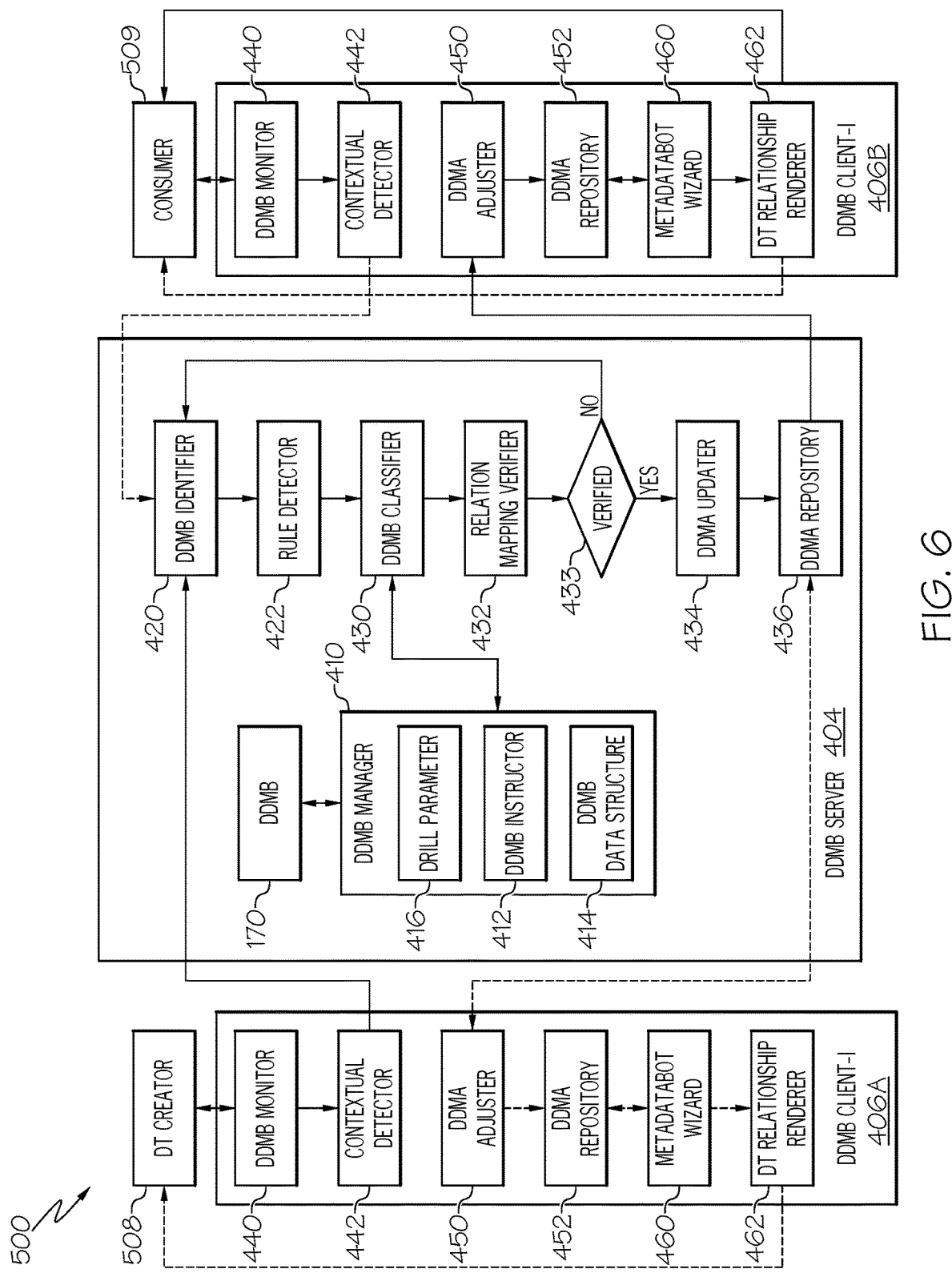
FIG. 6 shows a logical flow diagram according to an embodiment of the present invention.

Referring now to FIG. 6, a logical flow diagram 500 is depicted according to an embodiment of the present invention. Referring additionally to FIG. 5, as shown, logical flow diagram 500 includes actions performed at DDMB server 404 as well as at a plurality of DDMB clients 406A, 406B. As shown, user 180 (FIG. 2) has initiated an action to add, modify, delete, etc., a drill through link between a source report and a target report. In response, a DT creator 508 functionality is initiated on DDMB client 406A of user 180 (FIG. 2). First, DDMB monitor 440 in DDMB client 406A monitors for new data link generation (modification, deletion, etc.). This monitoring can result in an attribute update in metadata associated with any data item the indicates a modification in an association with drill through data being detected in real time using artificial intelligence (e.g., machine learning system 174 (FIG. 2)). As such, when such a metadata context and query specification update occurs, it is detected by a contextual detector 442, which forwards the information to a DDMB identifier 420 of DDMB server 404. DDMB identifier 420 identifies and create monitored data relationships cross different rows/columns, tables, databases, etc., based on the information forwarded by contextual detector 442. A rule detector 422 detects any classification rules that apply to the relationships, and groups of logics that apply to the relationships are classified and clustered as rule-based commands by DDMB classifier 430 based on information from DDMB instructor 412, DDMB data structure 414 and drill parameter 416. Once the groups of relationships logics have been classified and clustered, they can be passed to relation mapping verifier 432, which can verify the classified relationship mappings. At 433, a determination is made as to whether all relationships have been verified. If no, flow passes back to DDMB identifier 420. If at 433, it is determined that all relationships have been verified, DDMA updater 434 updates the verified relationships as metadata of the newly created or updated data and passes these updates to DDMB repository 436 in DDMB data structure 414. Thus, any or all detected changes can be recorded in DDMB data structure 414 in real time using artificial intelligence-based monitoring, identifying, and classifying.

Referring again additionally to FIGS. 2-3, drill through data determining module 210 can access DDMB data repository 436 to easily determine whether a source report retrieved in response to query 181 by user 180 contains drill through data. For example, drill through data determining module 210 can access DDMB data repository 436 to search for data associated with the source report. For each cell in the source report, DDMB data repository 436 can find entries associated with data entries that indicate drill through data exists cells in the source report. The results of this search can then be used to make the determination as to whether the source report contains drill through data.

MetadataBot initiating module 220, as executed by computing environment 100, is configured to initiate DDMB 170. In embodiments, DDMB 170 is initiated in response to a determination from drill through data determining module 210 that the source report contains a data item that is associated with drill through data. Conversely, if drill through data determining module 210 determines that the source report contains no data item that is associated with drill through data, DDMB 170 is not initiated. In any case, in an embodiment, a visual representation for DDMB 170 can be displayed on a user display. The visual representation can be displayed in conjunction with the source report or, alternatively, can be displayed as a stand-alone object separate from the source report. In embodiments, the visual representation can provide a graphical user interface that user 180 can interact with to more effectively retrieve drill through data.

DDMB parameter identifying module 230, as executed by computing environment 100, is configured to identify a set of DDMB parameters for the data item associated with the drill through data. To accomplish this, data from DDMA data repository 436 can be accessed by consumer 509 on DDMA client 406B in response to query 181. DDMA adjuster 450 can use the data to adjust DDMB 170 iteratively according to the updated metadata. In some embodiments, these updates can be stored to a local DDMA repository 452, which may act as a client-side cache of DDMA data repository 436 by storing entries from DDMA data repository 436 associated with reports that user 180 has accessed recently. In any case, DDMB parameter identifying module 230 can use DDMB 170 to search metadata associated with the query results to identify the DDMB parameters in response to the initiating of the DDMB 170.

Figure 7:
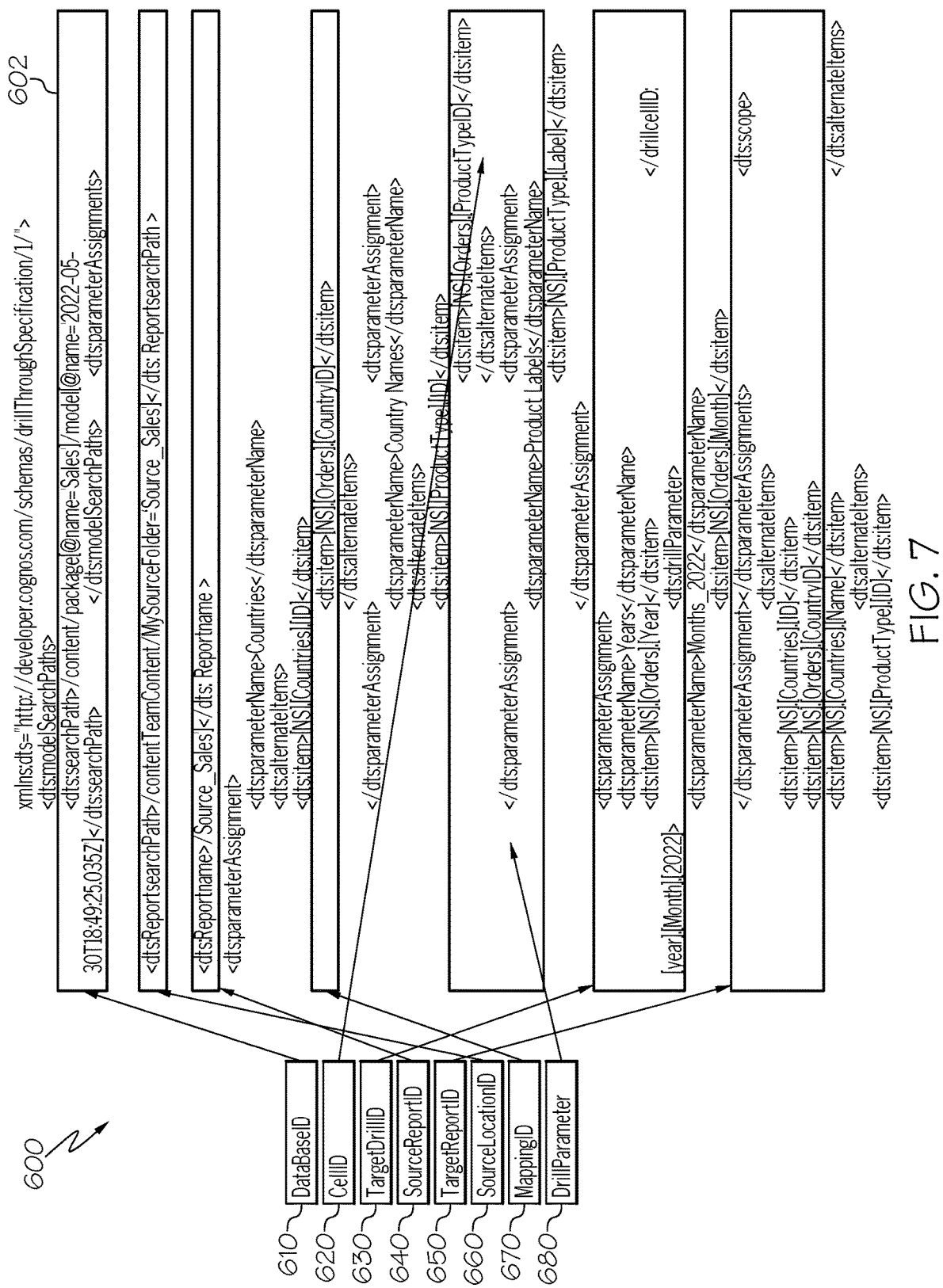
FIG. 7 shows example report metadata according to an embodiment.

Referring now to FIG. 7, example report metadata 600 is shown according to an embodiment. The DDMB parameters (e.g., parameter 602) returned from the search can include a CellID 620 of the cell containing the data item that is associated with the drill through data. The DDMB parameters returned from the search can also include a target report ID 650 of the target report that contains the drill through data. As shown, other DDMB parameters that can be returned include, but are not limited to a database ID 610, a target drill ID 630, a source report ID 640, a source location ID 660, a mapping ID 670, and a drill parameter 680.

Referring again to FIGS. 2 and 3, augmented report generating module 240, as executed by computing environment 100, is configured to generate, using DDMB 170, an augmented report that is based on the source report. Referring additionally to FIGS. 5 and 6, when DDMB 170 is activated, MetadataBot wizard 460 can display all linked assets in the source report, with the option to run. The augmented report can contain all of the cell data and functionality contained in the original source report. However, in addition, the augmented report can contain a visual identifier for the cell associated with the drill through data. In an embodiment in which a visual representation for DDMB 170 displayed on the user display has graphical user interface functionality, visual identifier can identify an object on the graphical user interface that identifies drill through data associated with a data item in the source report. Additionally or in the alternative, the visual identifier can be a distinguishing feature of the cell itself that distinguishes the data item from other data items that are not associated with drill through data. Whatever the case, the visual identifier can include any solution now known or later developed for identifying elements on a display including, but not limited to, highlighting, bolding, italics, borders, colors, differing font, different text size, pop-out, blinking, and/or the like. Whatever, the case, the visual identifier allows user 180 to easily identify data items that have links to drill through data, removing the current necessity for user 180 to engage with every cell to determine whether there is drill through data associated therewith. In embodiments, DDMB 170 can analyze a set of actions performed by user 180 on target reports retrieved by user 180 through drill through data over time. Based on this, DDMB 170 can determine a set of user preferences for user 180 in working with drill through data. These user preferences can include the type of display for the visual identifier as customized solutions for displaying cells linked to drill through data, cells that are not linked to drill through data, and/or the report as a whole. These preferences can be used by DDMB 170 to formulate a customized data format for the augment report.

Figure 8:
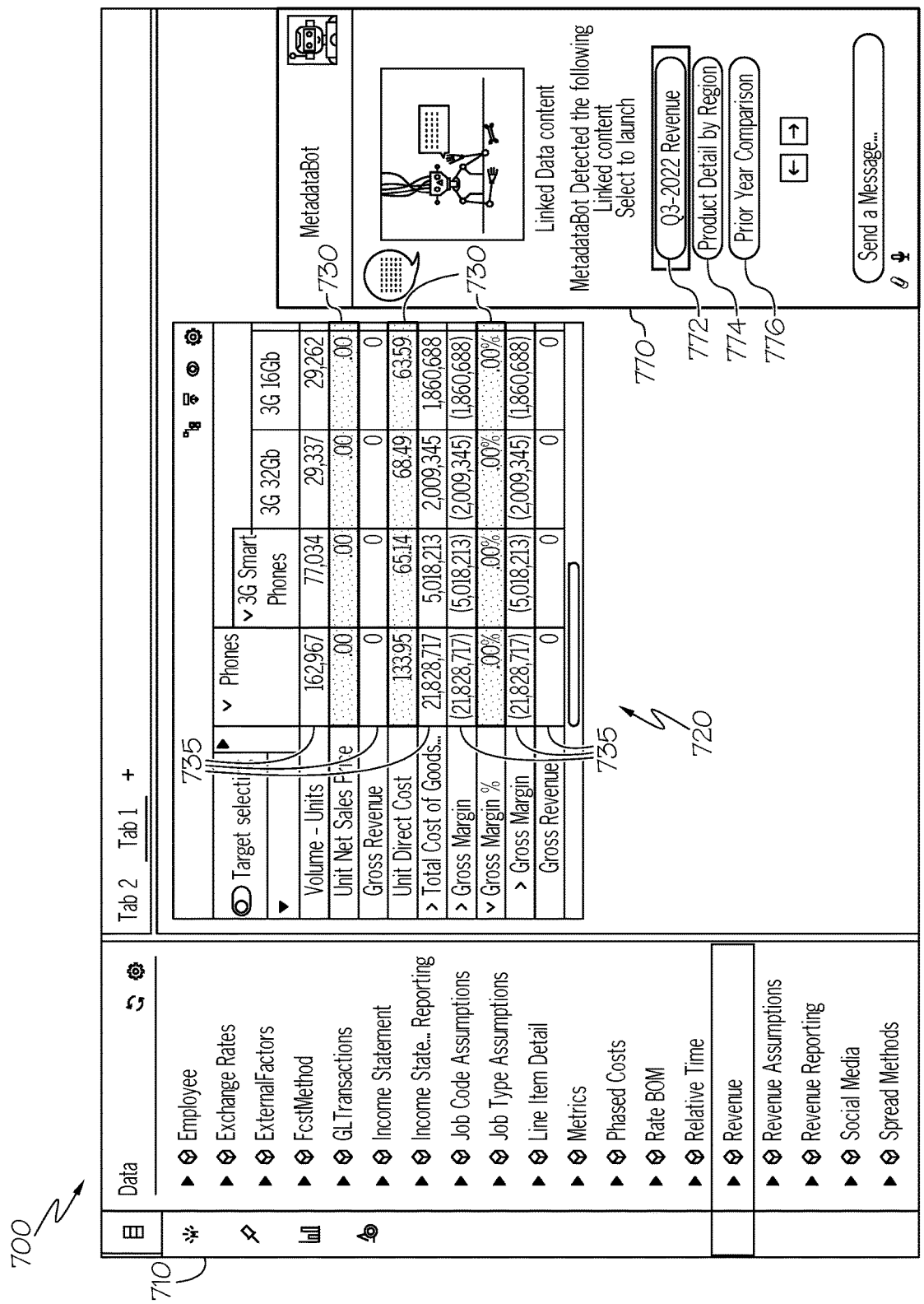
FIG. 8 shows an example user interface according to an embodiment.

Referring now to FIG. 8, an example user interface 700 is shown according to an embodiment. As shown, user interface includes a source report 710. Source report 710 contains a number of data items 720 retrieved in response to query 181 from user 180. As shown, data items 720 are arranged in cells. However, it should be understood that any solution for arranging report data that is now known or later developed is envisioned. In any case, also displayed in user interface 700 is a DDMB visual representation 770. As shown, DDMB visual representation 770 includes visual indicators 772, 774, 776, each of which indicates a data item that is associated with drill through data. As shown, visual indicator 772 indicates that there is associated Q3-2022 Revenue drill through data. Similarly, visual indicators 774 and 776 indicate that there is associated Product Data by Region and Prior Year Comparison drill through data, respectively. Further, source report 710 also includes additional visual indicators 730 in the form of shading of rows, which are associated with drill through data, serving to distinguish them from non-indicated 735 rows, which are not associated with drill through data.

Referring again to FIGS. 2 and 3, target report retrieving module 250, as executed by computing environment 100, is configured to retrieve, using DDMB 170, the target report in response to user 180 interacting with the visual identifier. The interaction by user 180 can include a mouse click, a hover, a highlight, a touch screen touch and/or any other type on interaction with an area of a display that is now known or later developed.

Figure 9:
FIG. 9 shows an example user interface according to an embodiment.

Referring now to FIG. 9 an example user interface 800 is shown according to an embodiment of the present invention. an example user interface 700 is shown according to an embodiment. As shown, user interface 800 includes source report 710 with the same data items 720 shown in FIG. 8. In addition, highlighted area 872 surrounding visual indicator 772 indicates that user 180 (FIG. 2) has interacted with visual indicator 772. As a result, a target report 880, which contains Q3-2022 Revenue data associated with source report 710, has been opened in user interface 800.

Referring again to FIG. 2 in conjunction with FIG. 9, in embodiments, DDMB can perform additional functions that further enhance retrieval of drill through data. For example, there may be cases in which a change of a dataset containing a data item that is associated with the drill through data to a new saved location is desired. This location change could involve a data migration, a backup operation, and or the like. In response to such a location change, system 200 can determine whether the dataset contains a data item that is associated with drill through data. In response, a positive determination, system 200 can activate DDMB 170, which can display DDMB visual representation 770. Referring additionally to FIGS. 5 and 6, when DDMB 170 is activated, MetadataBot wizard 460 can display all linked assets to the data item. DT relationship renderer 462 can activate DDMB 170 and can additionally display a list of linked content with option to auto-include in the migration, backup, etc. For example, the activated DDMB can display (e.g., via DDMB visual representation 770) an identification of any target reports that are determined to be associated with data items in undergoing the location change. This display can include a graphical user interface that allows user 180 to select whether to save target report 880 along with the data items that are undergoing the location change. Alternatively, DDMB can automatically make the selection (e.g., based on how often user 180 accesses target report 880). Whatever the case, target report 880 can be saved in the new saved location along with the data item.

Figure 10:
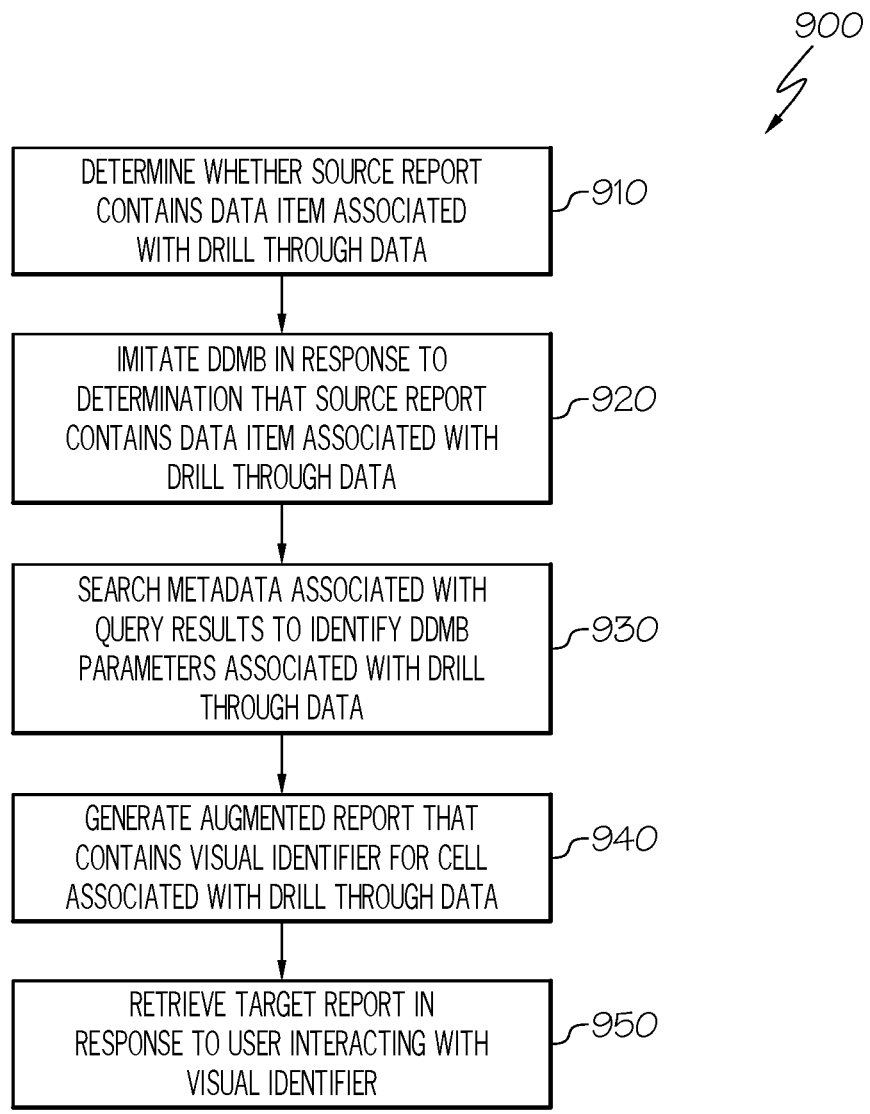
FIG. 10 shows a method flow diagram according to an embodiment of the present invention.

FIG. 10 depicts a method flow diagram 900 for enhancing retrieval of drill through data according to an embodiment of the present invention. Referring additionally to FIGS. 2 and 3 and 9, at 910, a determination is made as to whether source report 710 contains data item 720 associated with drill through data. At 920, DDMB 170 is initiated in response to a determination that source report 710 contains a data item 720 associated with drill through data. At 930, metadata associated with query results is searched to identify DDMB parameters associated with drill through data. At 940, an augmented report that contains a visual identifier for a cell associated with drill through data is generated. At 950, target report 880 is retrieved in response to user 180 interacting with visual identifier.

It will be appreciated that the logical and method process flow diagrams of FIGS. 6 and 10 represent possible implementations of process flows for enhancing retrieval of drill through data, and that other process flows are possible within the scope of the invention. The method process flow diagrams discussed above illustrate the architecture, functionality, and operation of possible implementations of systems, methods, and computer program products according to various embodiments of the present invention. In this regard, each portion of each flowchart may represent a module, segment, or portion of code, which comprises one or more executable instructions for implementing the specified logical function(s). It will also be noted that each block of each flowchart illustration can be implemented by special purpose hardware-based systems that perform the specified functions or acts.

Further, it can be appreciated that the approaches disclosed herein can be used within a computer system for enhancing retrieval of drill through data. In this case, as shown in FIG. 1, network module 115 can be provided, and one or more systems for performing the processes described in the invention can be obtained and deployed to computing environment 100 (FIG. 1). To this extent, the deployment can comprise one or more of: (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computing environment 100 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computing environment 100 may be practiced in distributed computing environments where tasks are performed by remote processing devices that are linked through a communication network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, System 200 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

It is apparent that there has been provided with this invention an approach for enhancing retrieval of drill through data. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for enhancing retrieval of drill through data, comprising the computer-implemented steps of:

monitoring, in real time at one or more clients in communication with a server, modifications in drill through data relationships;

recording, at the server, at least one modification detected based on the monitoring as an attribute update in metadata of at least one data item corresponding to the drill through data relationship;

based on the attribute update, updating a drill through data repository;

generating a source report from query results of a query by a user at a client from the one or more clients;

determining that the source report contains a data item that is associated with drill through data from the drill through data repository;

initiating, at the server and in response to the determination that the source report contains the data item that is associated with the drill through data, a data drill MetadataBot (DDMB);

searching, in response to the initiating of the DDMB, metadata associated with the query results to identify a set of DDMB parameters for the data item that is associated with the drill through data, the DDMB parameters including a cell containing the data item that is associated with the drill through data and a target report containing the drill through data;

generating, by the DDMB, an augmented report that contains a visual identifier for the cell in the source report containing the data item that is associated with the drill through data, wherein the DDMB includes a machine learning model configured to perform the generating, the machine learning model trained on actions performed by the user on target reports retrieved by the user through drill through data over time; and retrieving the target report in response to the user interacting with the visual identifier.

2. The computer-implemented method of claim 1, further comprising:

recording, using an artificial intelligence in real time, the attribute update in a DDMB data structure; and accessing the DDMB data structure for entries associated with data entries for a set of cells in the source report to perform the determining.

3. The computer-implemented method of claim 2, wherein, in response to a determination that no data item in a next source report is associated with drill through data, the DDMB is not initiated.

4. The computer-implemented method of claim 1, further comprising:

determining, in response to a change of a dataset to a new saved location, whether the dataset contains the data item that is associated with the drill through data;

activating, in response to a determination that the dataset contains the data item that is associated with the drill through data, the DDMB;

displaying, by the DDMB, the target report associated with the data item; and saving the target report along with the data item in the new saved location.

5. The computer-implemented method of claim 4, wherein the change of the dataset to the new saved location is at least one of a data migration or a backup operation.

6. The computer-implemented method of claim 1, wherein the DDMB parameters further include a database ID, a target drill ID, a source report ID, a source location ID, a mapping ID, and a drill parameter.

7. The computer-implemented method of claim 1, further comprising:

determining, by the DDMB using the machine learning model, a set of user preferences for the user in working with drill through data; and formulating a customized data format for the augmented report that is based on the set of user preferences.

8. A system for enhancing retrieval of drill through data, comprising:

a memory medium comprising program instructions;

a bus coupled to the memory medium; and a processor, for executing the program instructions, coupled to the memory medium that when executing the program instructions causes the system to:

monitor, in real time at one or more clients in communication with a server, modifications in drill through data relationships;

record, at the server, at least one modification detected based on the monitoring as an attribute update in metadata of at least one data item corresponding to the drill through data relationship;

based on the attribute update, update a drill through data repository:

generate a source report from query results of a query by a user at a client from the one or more clients;

determine that the source report contains a data item that is associated with drill through data from the drill through data repository;

initiate, at the server and in response to the determination that the source report contains the data item that is associated with the drill through data, a data drill MetadataBot (DDMB);

search, in response to the initiating of the DDMB, metadata associated with the query results to identify a set of DDMB parameters for the data item that is associated with the drill through data, the DDMB parameters including a cell containing the data item that is associated with the drill through data and a target report containing the drill through data;

generate, by the DDMB, an augmented report that contains a visual identifier for the cell in the source report containing the data item that is associated with the drill through data, wherein the DDMB includes a machine learning model configured to perform the generating, the machine learning model trained on actions performed by the user on target reports retrieved by the user through drill through data over time; and retrieve the target report in response to the user interacting with the visual identifier.

9. The system of claim 8, the program instructions further causing the system to:

record, using an artificial intelligence in real time, the attribute update in a DDMB data structure; and access the DDMB data structure for entries associated with data entries for a set of cells in the source report to perform the determining.

10. The system of claim 9, wherein, in response to a determination that no data item in a next source report is associated with drill through data, the DDMB is not initiated.

11. The system of claim 8, the program instructions further causing the system to:

determine, in response to a change of a dataset to a new saved location, whether the dataset contains the data item that is associated with the drill through data;

activate, in response to a determination that the dataset contains the data item that is associated with the drill through data, the DDMB;

display, by the DDMB, the target report associated with the data item; and save the target report along with the data item in the new saved location.

12. The system of claim 11, wherein the change of the dataset to the new saved location is at least one of a data migration or a backup operation.

13. The system of claim 8, wherein the DDMB parameters further include a database ID, a target drill ID, a source report ID, a source location ID, a mapping ID, and a drill parameter.

14. The system of claim 8, the program instructions further causing the system to:
- determine, by the DDMB using the machine learning model, a set of user preferences for the user in working with drill through data; and
- formulate a customized data format for the augmented report that is based on the set of user preferences.

15. A computer program product for enhancing retrieval of drill through data, the computer program product comprising a computer readable storage device, and program instructions stored on the computer readable storage device, to:
- monitor, in real time at one or more clients in communication with a server, modifications in drill through data relationships;
- record, at the server, at least one modification detected based on the monitoring as an attribute update in metadata of at least one data item corresponding to the drill through data relationship;
- based on the attribute update, update a drill through data repository;
- generate a source report from query results of a query by a user at a client from the one or more clients;
- determine that the source report contains a data item that is associated with drill through data from the drill through data repository;
- initiate, at the server and in response to the determination that the source report contains the data item that is associated with the drill through data, a data drill MetadataBot (DDMB);
- search, in response to the initiating of the DDMB, metadata associated with the query results to identify a set of DDMB parameters for the data item that is associated with the drill through data, the DDMB parameters including a cell containing the data item that is associated with the drill through data and a target report containing the drill through data;
- generate, by the DDMB, an augmented report that contains a visual identifier for the cell associated with the drill through data, wherein the DDMB includes a machine learning model configured to perform the generating, the machine learning model trained on actions performed by the user on target reports retrieved by the user through drill through data over time; and
- retrieve the target report in response to the user interacting with the visual identifier.

16. The computer program product of claim 15, the program instructions stored on the computer readable storage device further to:
- record, using an artificial intelligence in real time, the attribute update in a DDMB data structure; and
- access the DDMB data structure for entries associated with data entries for a set of cells in the source report to perform the determining.

17. The computer program product of claim 16, wherein, in response to a determination that no data item in a next source report is associated with drill through data, the DDMB is not initiated.

18. The computer program product of claim 15, the program instructions stored on the computer readable storage device further to:
- determine, in response to a change of a dataset to a new saved location, whether the dataset contains the data item that is associated with the drill through data;
- activate, in response to a determination that the dataset contains the data item that is associated with the drill through data, the DDMB;
- display, by the DDMB, the target report associated with the data item; and
- save the target report along with the data item in the new saved location,
- wherein the change of the dataset to the new saved location is at least one of a data migration or a backup operation.

19. The computer program product of claim 15, wherein the DDMB parameters further include a database ID, a target drill ID, a source report ID, a source location ID, a mapping ID, and a drill parameter.

20. The computer program product of claim 15, the program instructions stored on the computer readable storage device further to:
- determine, by the DDMB using the machine learning model, a set of user preferences for the user in working with drill through data; and
- formulate a customized data format for the augmented report that is based on the set of user preferences.

* * * * *